Oct. 8, 1940.   M. W. DITTO   2,217,540
APPARATUS FOR THE PRODUCTION OF STEEL
Filed July 15, 1939   4 Sheets-Sheet 1
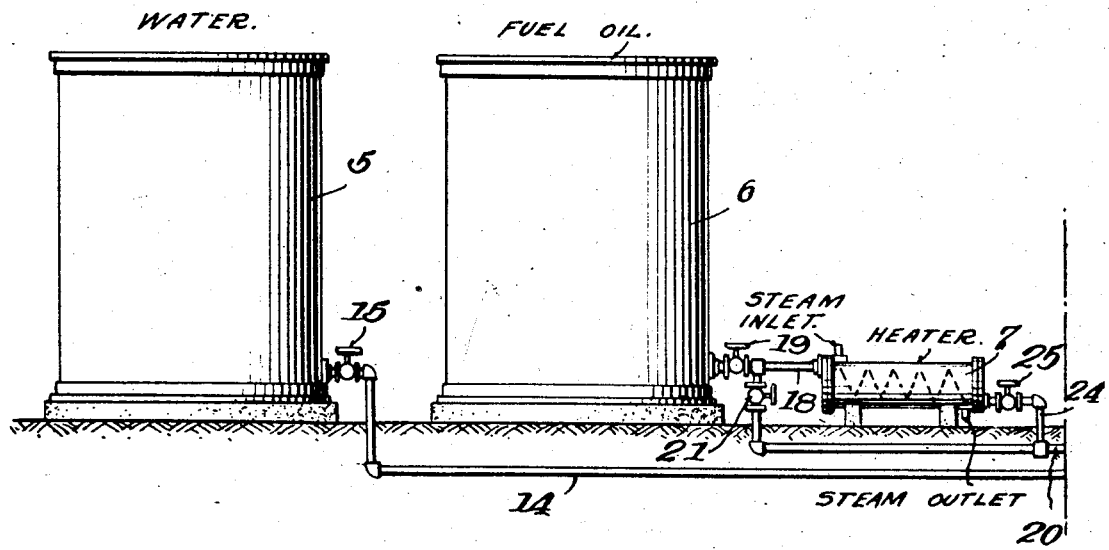
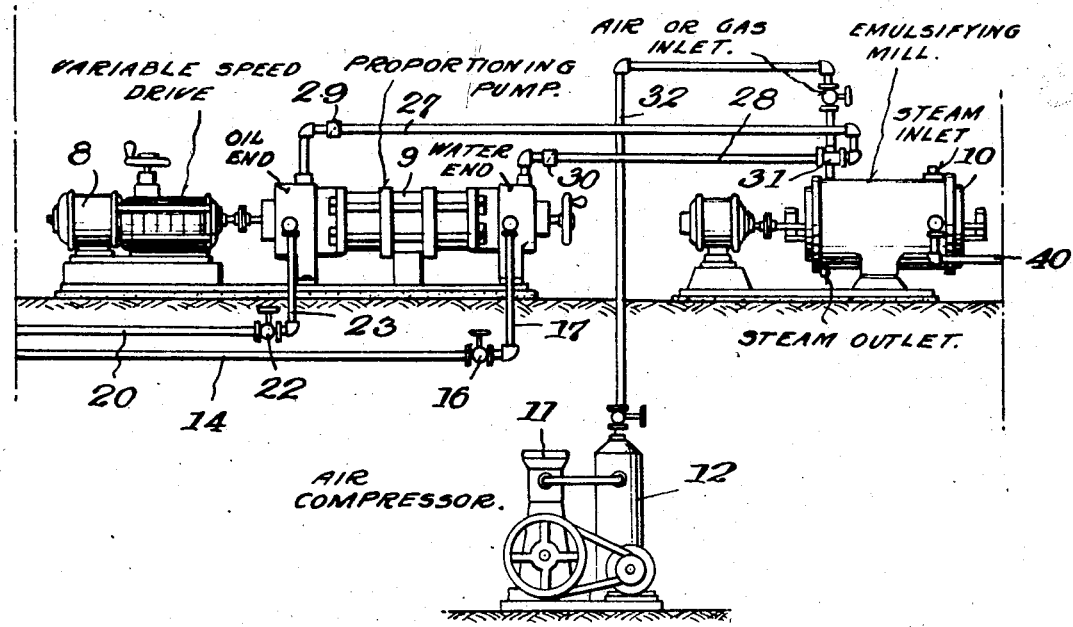

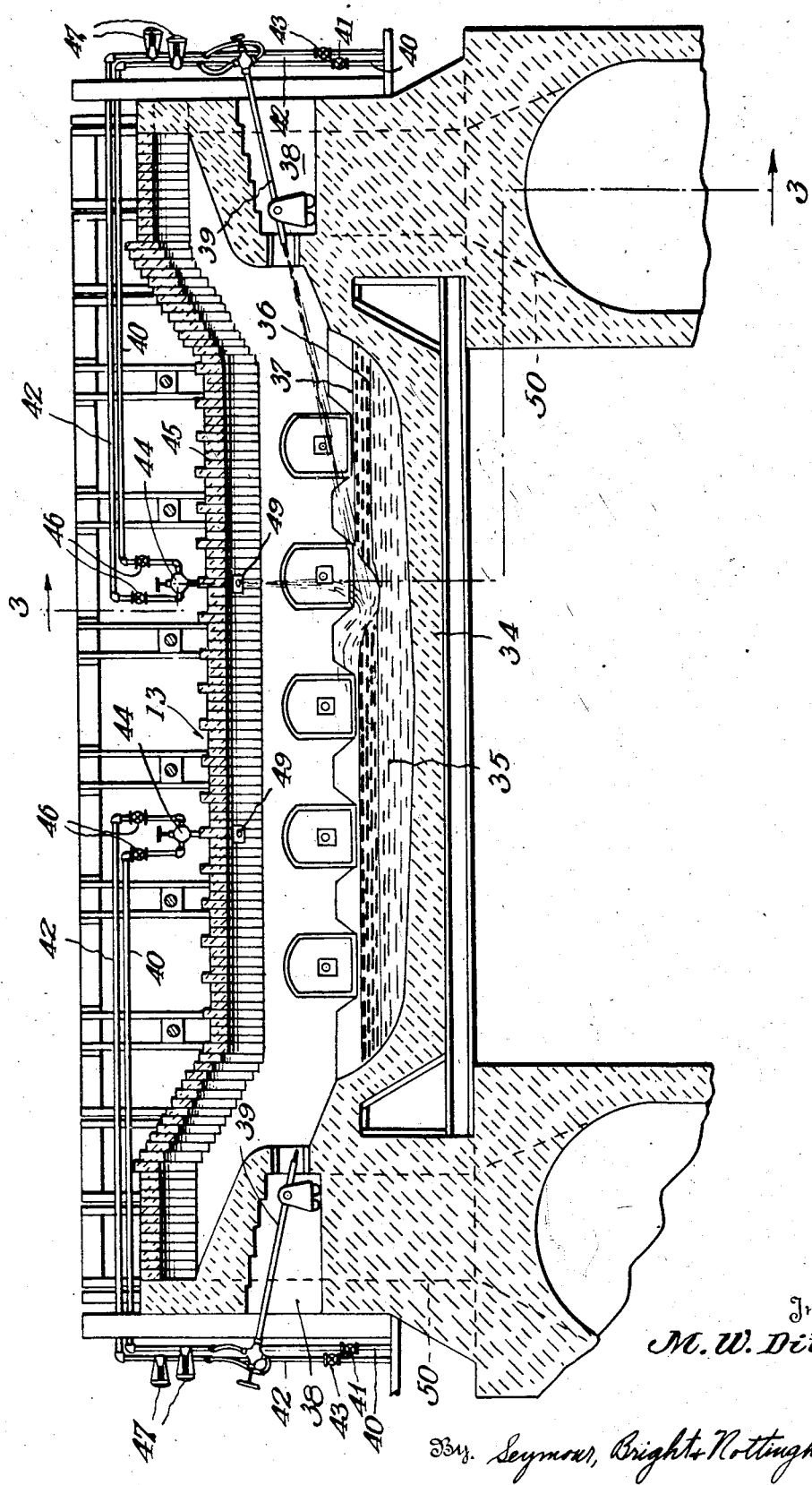

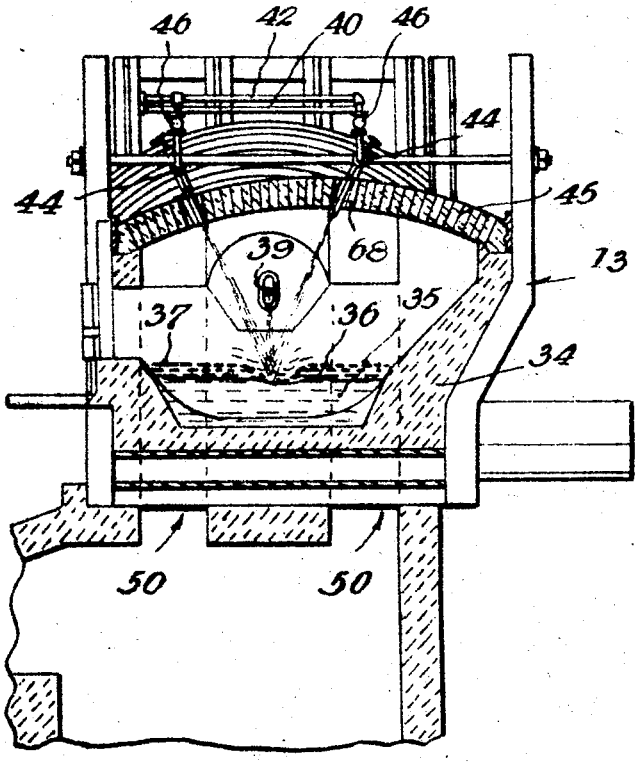
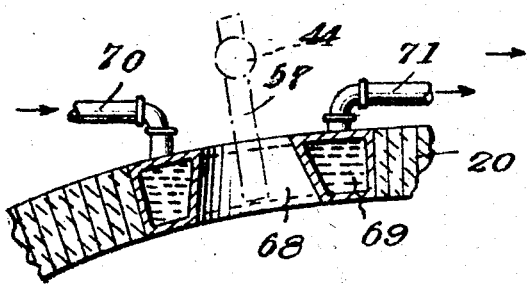
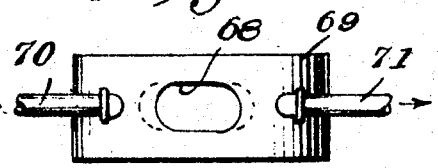

Oct. 8, 1940.  M. W. DITTO  2,217,540
APPARATUS FOR THE PRODUCTION OF STEEL
Filed July 15, 1939 4 Sheets-Sheet 4
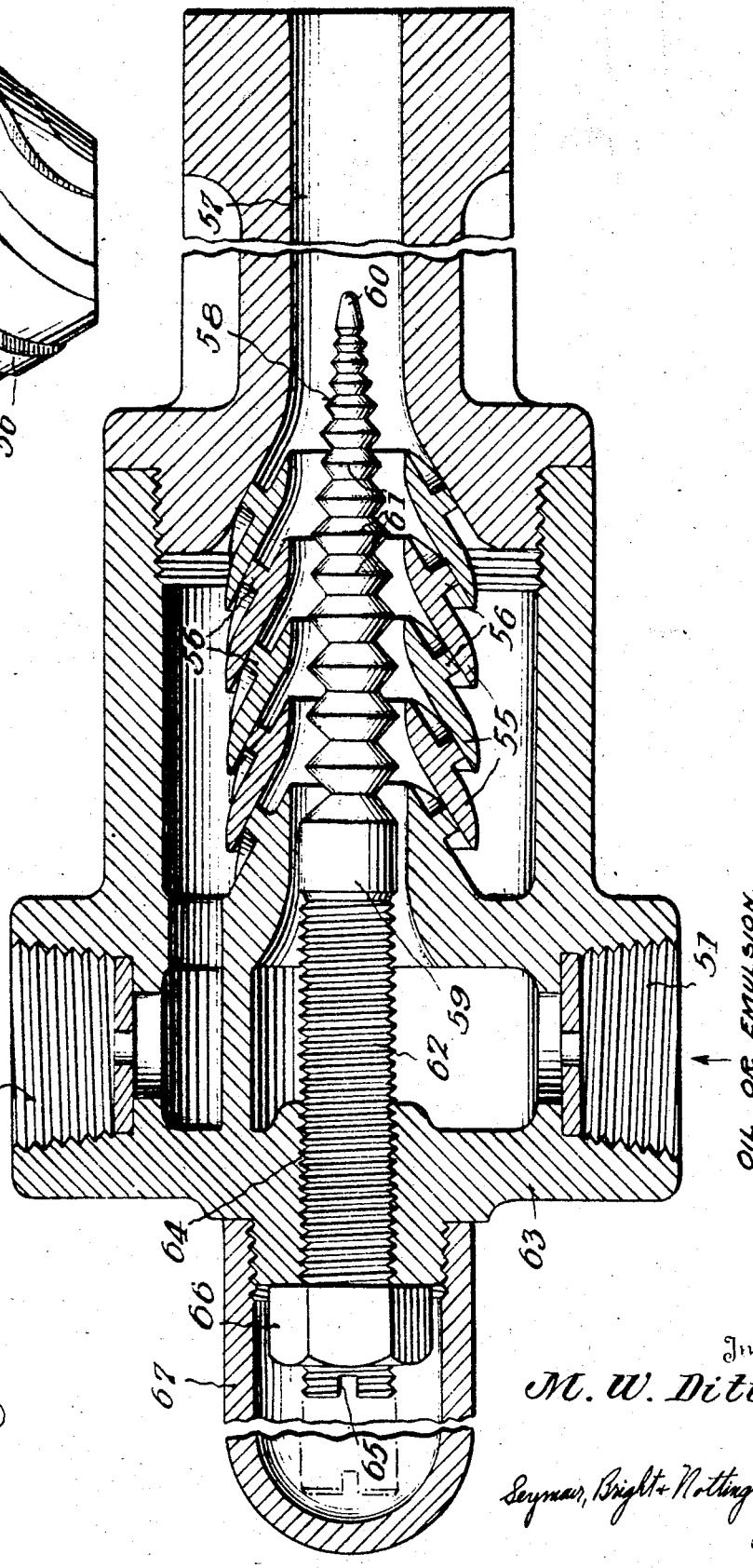
Inventor
M. W. Ditto.
Seymour, Bright & Nottingham
Attorneys Patented Oct. 8, 1940

2,217,540

UNITED STATES PATENT OFFICE 2,217,540

APPARATUS FOR THE PRODUCTION OF STEEL

Marvin W. Ditto, New York, N. Y., assignor to Emulsions Process Corporation, New York, N. Y., a corporation of Delaware Application July 15, 1939, Serial No. 284,800

3 Claims. (Cl. 266—33)

This application is a continuation-in-part of my applications, Serial Nos. 237,544, 243,463 and 259,043, filed respectively on October 29, 1938, December 1, 1938, and February 28, 1939.

My invention relates primarily to the production of steel and more particularly to the production of steel in an open hearth furnace.

In accordance with my invention water is introduced into the furnace in a practical way so as to enter in the reaction and form ferric oxides.

I have designed an apparatus that has proved successful in practice, and in accordance with the invention, I provide a steel production apparatus which will reduce the period of time required to make steel from scrap iron, pig iron and ore, scrap steel or a combination of iron in the above forms. The use of my apparatus results in the reduction of costs of producing steel, increasing the tonnage production of the furnace and in better control of the oxidizing reactions compared to standard practice today.

In practicing the invention with my apparatus, an emulsified fuel of oil and water or its equivalent, and optionally containing a gas having oxygen as a constituent, is introduced into the open hearth in atomized condition and at high velocity by one or more burners having discharge end or ends positioned some distance above the surface of the pool or mass of metal. From the time the emulsion emerges from the burner nozzle or nozzles, until it impinges upon the molten bath in the hearth, it proceeds through a cycle of combustion, that is, the light hydrocarbons are burned off first cracking out carbon as the thermal decomposition of the fuel proceeds. This carbon being cracked out at a high temperature in the presence of water vapor decomposes the water to form carbon monoxide and hydrogen by the well known water gas reaction. While the above water gas reaction is taking place, the total temperature of the entire mass of the emulsion is being raised rapidly to the temperature at which decomposition of the excess water with iron or carbon takes place. Therefore, instead of impinging water at a relatively low temperature against the metallic bath, water and fuel oil at a relatively high temperature are being impinged, thereby permitting a more rapid reaction and consequently, a speedy combination of the oxygen with the molten iron and excess carbon present in the fuel.

In the use of emulsified fuel with my apparatus, the fuel generates enough heat during its combustion to supply by exothermic reaction, the necessary heat for the decomposition of the water. Therefore, by this extra supply of heat, all reactions taking place in the furnace are exothermic so far as the total heat demand is concerned. In this way, instead of having a reduction in temperature of the metal in molten state to supply the heat of dissociation of the water, the oil in the emulsion supplies this heat, and the net heat gain of the furnace is the result of the heat produced by the burning of the iron to $Fe_2O_3$ or $Fe_3O_4$, and the recombustion of the CO to $CO_2$ and the recombustion of the free hydrogen to $H_2O$ vapors. This sequence of events cannot happen by the introduction of water alone as in such instance the heat reactions are dependent upon the burning of the iron to form the oxides, and while that reaction is exothermic, it is not exothermic in sufficient excess to maintain a desirable heat balance.

As I employ an emulsified fuel containing the water in liquid state, I can control and vary the percentage of water in the fuel so that the oxidation of the iron resulting in the formation of steel can be controlled.

In using my apparatus I have found better results can be obtained if the emulsified fuel impinges against the top of the molten metallic mass over a wider area than is possible when a single jet only impinges the mass, as the plural jets will create turbulence over a relatively large area of the upper portion of the molten mass, and this will result in an increased reaction at the interface contact between metal and slag.

Having now indicated in a general way the nature and purpose of my invention, I will proceed to a detail description thereof with reference to the accompanying drawings, in which I have illustrated a preferred embodiment of a suitable apparatus that may be used in practicing the invention, and in which:

Figs. 1 and 1A are side elevations respectively of a series of units employed in manufacturing and pumping the emulsion.

Fig. 2 is a longitudinal vertical sectional view of a portion of an open hearth furnace and showing my improved apparatus features incorporated therein.

Fig. 3 is a transverse vertical sectional view taken on the line 3—3 of Fig. 2.

Fig. 4 is a transverse vertical sectional view of a detail of a water-cooled port of the type which may be used in the roof of the furnace in connection with any one of the emulsion burners arranged at the roof portion of the furnace.

Fig. 5 is a top plan view of such port.

Fig. 6 is a longitudinal sectional view of one of the emulsion burners.

Fig. 7 is an elevation of one of the substantially conical mixing collars forming part of the burner.

Referring to the drawings, 5 designates a water tank; 6 a fuel oil tank; 7 an oil heater; 8 a variable speed driving mechanism; 9 a proportioning pump; 10 an emulsifying mill; 11 an air compressor; 12 a compressed air storage tank; and 13 an open hearth furnace.

The proportioning pump may be of any suitable construction, such as a plurality of pumps of the type disclosed in the U. S. Patent to Fenchelle, No. 1,289,716, or a single pump of the type disclosed in my application, Serial No. 230,480, filed Sept. 17, 1938. With such a pump structure the percentage of water in ratio to the fuel oil may be varied as desired.

The emulsifying mill 10 may be of the type disclosed in the U. S. patent to Russell, No. 2,059,535, or in my application Serial No. 218,883, filed July 12, 1938.

The water tank is connected by a pipe 14 having valves 15 and 16 interposed therein, to a pipe 17 leading the water to one end of the proportioning pump. A pipe 18, provided with a valve 19, connects the oil tank to the inlet of the heater 7. Another pipe 20 having valves 21 and 22, connects the pipe 18 to a pipe 23 leading to the oil end of the proportioning pump. A pipe 24 having an interposed valve 25 connects the outlet of the heater to the pipe 20 at a point between the valves 21 and 22. It is obvious from the foregoing that oil may be passed from the tank 6 to the proportioning pump either directly or through the heater. The proportioning pump is driven by the driving mechanism 8, and the pumped oil is discharged through a pipe 27, and the water is discharged through a pipe 28; these pipes being provided respectively with check valves 29 and 30. Pipes 27 and 28 are connected to the inlet 31 of the emulsifying mill, which, like the heater, may be steam heated.

A valved pipe 32 connects the compressed air storage tank 19 to the inlet of the emulsifier.

The open hearth furnace is of conventional construction having a hearth 34 to receive the charge or mass 35 that is to be converted into steel. 36 indicates the upper surface line of the metal and 37 the upper surface line of the slag.

Such furnace is preferably of the regenerator type and is provided at the ends thereof with openings 38 to receive the burners employed.

In accordance with my invention, the burners 39 which cooperate with the ports 38 are employed to introduce either jets of fuel oil and steam or jets of water-in-fuel oil emulsion and steam alternately through the opposite end portions of the furnace and on to the charge contained in the hearth.

The burners 39 and 44 in the present case can receive either fuel oil from any suitable source or an emulsion of water and fuel oil from the emulsifying mill 10, through pipes 40 having hand-controlled valves 41. Steam, at high velocity is fed into the burners through pipes 42 having hand-controlled valves 43.

Each burner may be of the type shown in Figs. 6 and 7 and may have a port 51 for the introduction of fuel oil or the emulsion. Another port 52 axially aligned with the port 51 is arranged at the opposite side of the burner and is in communication with the pipe which supplies the steam. Each burner is provided internally with a series of nested collars 55 forming a central passageway through which the fuel oil and emulsion travel and in which it is mixed with the steam. It will be noted from Fig. 7, that the periphery of each collar 55 is provided with a series of helical threads 56, and it may be seen from Fig. 6 that such threads form spacing elements between the collars and provide helical passageways through which the steam must pass before reaching the liquid. Consequently, the steam is caused to whirl before striking the liquid and this whirling action will increase the degree of mixing within the collars and will also tend to drive the liquid rapidly out through the nozzle 57 of the burner.

A stem 58 having a portion extending from a cylindrical part 59 to its tip 60, made up of a series of bi-conical beads 61, extends through the mixing portion of the burner and is provided with a threaded extension 62 having threaded connection with a stationary portion 63 of the burner as indicated at 64. The extremity of the stem may be provided with a groove 65 to receive the end of a screw driver employed in adjusting the stem, and a lock nut 66 may engage the outer portion of the threaded extension for locking it in any position of adjustment. A removal cap 67 normally covers the outer end of the threaded extension and the lock nut.

As may be seen from Figs. 4 and 5, the nozzle 57 of each of the roof burners extends through an elongated flared port 68 arranged in the roof or arch of the furnace and provided with a water jacket 69. Water for cooling purposes may be passed through the jacket by means of pipes 70 and 71. At this point it will be noted that either one of the roof burners may be turned about the axis of its ports 51 and 52 so that the jet issuing from the burner may impinge upon the charge at various places in the vicinity of the spot where the jet from the burner 39 strikes the same.

As may be seen from Fig. 2, the outlet of each burner 39 is spaced from one end of the hearth or arranged laterally of the hearth and consequently the jet issuing from such burner travels a relatively great distance before it impinges against the upper portion of the molten mass. Hence, its velocity is diminished to some extent and consequently it may not cause sufficient turbulence. Furthermore, if only one jet or stream is introduced from an end of the hearth, it will strike the molten mass only over a relatively small area whereas it is advantageous to have the emulsion present and disturbing the mass over a relatively large area. To this end I provide with each burner 39 one or more additional similar burners 44 positioned at the arch or roof 45 of the furnace at the point or points directly above the hearth so that such auxiliary burners can direct jets of water-in-fuel oil emulsion at high velocity directly against the top of the mass in the hearth and thereby cause great turbulence over a wide area of the upper portion of the mass.

As may be seen from Figure 3, I propose to employ two roof burners 44 in combination with each end burner 39, and each of the burners 44, 39 need not be of the construction illustrated in Figs. 6 and 7, but may be of any suitable mixer type.

In order to control the burners 44, the pipes 40 and 42 are provided adjacent thereto with hand-controlled valves 46, and at points adjacent the ends of the furnace with remote control valves 47 which may be of the diaphragm type so that they can be remotely controlled by any suitable fluid pressure.

In first practicing my invention, I used the conventional equipment with which an open hearth furnace was equipped. Where the furnace was burning conventional fuel, the usual procedure has been to have a burner on either end of the furnace which is on for alternate periods during the furnace reversals. This meant that through one steam atomizing burner, I had to handle from one to one and a half tons of oil per hour, and the area of the charge upon which there is direct impingement from the burner arrangement is necessarily limited. This is not of particular importance, under normal procedure, where fuel oil only is used for heating but in my system where it is necessary to obtain intimate contact over as wide an area as possible between the bath in the furnace and the water-in-fuel oil emulsion, it is important that the emulsion be so injected that it will reach the bath without loss of high velocity thereby causing turbulence and penetration of the slag layer by the jet, and to also have a large area of contact.

In other words, when introducing the emulsion it is advantageous that contact be secured with the slag and metal over as wide an area as is consistent with the design of the furnace, and that sufficient velocity still be present when the jet impinges upon the molten mass that the reaction will be carried on rapidly.

In practicing the process, at the start of the heat, burners 39 are used in the conventional manner with fuel oil, or emulsion containing only a small percentage of water, for example, 5%. The burners 39 are alternately used in this way and the firing is continued with the usual reversals of the furnace until the period during the heat when it is deemed desirable to introduce the emulsion. If oil has been used as fuel, it is then shut off and the emulsion is introduced in place of the fuel oil in the burners 39, and the remote control valves 47 are then opened by the operator to allow the emulsion and steam to be admitted into the burners 44. The effect of the high velocity by the steam or the like in driving the emulsion from the three burners on to the surface of the slag causes turbulence, the impact of the jets on the surface on the underlying metal causes the surface to be displaced thereby imparting motion to the metal surface. This effects a rapid formation of iron oxide through the action of the gases derived from the water of the emulsion to cause in turn the reactions so well known as to need no further description.

The combustion above the pool or bath is very rapid due to the high nozzle velocity of the emulsion mixture from the burners 44 drawing air by induction into the furnace through the ports 49. Also the hot air coming up one or the other of the conventional intakes 50 of the furnace tends to travel along under the roof 45 and mixes into the flame as a result of the high jet velocity of the emulsion. Due to the short distance that the flame has to travel, it still has a heavy body when the jets impinge on the slag covering. This is a great advantage when foaming heats are encountered.

Using a proportioning pump of the type disclosed herein, I can produce a fuel oil emulsion containing, say 5 to 10 per cent of water, and use this during the beginning of the heat to raise the temperature of the charge to the point where slag forms on the surface of the pool; then the percentage of water in the emulsion can be raised to say 25% to 35%, and this emulsion can be used as a fuel and oxidizing agent in the furnace during decarbonization of the iron for the period or periods required to oxidize the carbon to any desired point to meet the specifications of the steel.

In practice, the emulsion entering the burners will be under a pressure of from approximately 300 to 400 pounds per square inch, and as the emulsion is mixed in the burners with steam under a pressure of about 100 pounds per square inch, the jets discharging from the burners will travel at a speed of about 20,000 feet per minute. Consequently, each jet will not only impinge against the upper surface of the bath, but will depress the pool at the point of impingement, and, of course, as the burners 44 are closer to the upper surface of the pool than the burners 39, the jets issuing from the former will set up an agitation or turbulence functioning to increase the speed of the reaction and to rapidly oxidize the carbon in the iron.

I have found that the oil contained in the emulsion supplies more than sufficient heat to bring about the dissociation of water into its component gases and thereby eliminates the necessity of the metal supplying heat to bring about the reaction of dissociation, that is, the temperature of the flame resulting from the combustion of the emulsion maintains the reaction with the formation of carbon monoxide and hydrogen, and transmits heat to the surface of the metal at the same time. The oxygen and hydrogen being in contact with the slag and metal substances at some period when critical temperatures are reached and during the period when the oxygen and hydrogen are present, the oxidizing effect of the oxygen upon the slag or the metal is very rapid. In using the invention, the hearth may be charged with limestone, scrap steel and cold pig iron, and the charge may be brought to molten condition in the usual way, or the hearth may be charged with limestone and scrap steel which may be brought to molten condition in the conventional manner before the charge is completed by the introduction of hot iron from a blast furnace or the like. I also propose to use as an initial charge, hot iron from a blast furnace and then inject the emulsion on to the top of the pool for oxidizing purposes before calcined lime is added to the pool.

The longer the period the iron has to remain in the furnace for the conversion into the steel, the more fuel is required, therefore the greater the cost. As I reduce the time period with my apparatus, obviously the cost is decreased. Also by using the emulsion I am able to reduce the amount of oxidizing ores employed in making steel. As I reduce or entirely eliminate such materials (usually introduced in cold condition) I, of course, save the fuel required to heat such cold materials. By observing the drop of carbon in the pool, and regulating the period the emulsion is turned on in the furnace, better control of furnace conditions are available and thereby steel is made at a faster rate.

I also contemplate using one or more of the burners to supply a relatively lean emulsion having up to 10% water and the other having up to 90% of water, and to so control the proportions of the constituents of the jets as to obtain the desired result. Obviously such burners could be used alternately; the burner carrying the lean emulsion operating during the early period of the treatment, and the burner carrying the emulsion rich in water being subsequently used for the final reaction of decarbonization.

With the apparatus herein disclosed, I can approach the optimum operating conditions of intimately or continuously disturbing the surface of the slag and in turn the surface of the metal and increase the rate of reaction as a result of the action of the emulsified fuel or its equivalent while in process of combustion being brought in contact with these substances.

My apparatus eliminates the disadvantages of introducing water into the metal as heretofore proposed:

1. Because it does not dissipate the heat content of the metal whereas water alone will reduce the temperature thereby stopping the reaction;

2. Eliminates explosive action in the metal; and

3. Due to the excess heat value over the actual heat demand required from the reaction, the metal is not cooled.

The processes practiced in my apparatus are claimed in my above-mentioned applications Serial Nos. 243,463 and 259,043.

From the foregoing it is believed that the construction, operation and advantages of my invention may be readily understood by those skilled in the art and I am aware that changes may be made in the details disclosed without departing from the spirit of the invention as expressed in the following claims.

What I claim and desire to secure by Letters Patent is:

1. In apparatus of the character described, a furnace having a stationary hearth adapted to contain a pool of molten metal, a burner arranged to inject a fuel emulsion downwardly toward said hearth and on to the upper surface of said pool, a variable proportioning pump, an emulsifying mill, a conduit connecting the proportioning pump to the mill for conveying a stream of water from the pump to the mill, another conduit for conducting a stream of fuel oil from the pump to the mill, and a pipe connecting the outlet of the mill to said burner.

2. In an open hearth furnace, a burner arranged at each end of the furnace and having a nozzle directed toward the hearth of the furnace, second burners positioned at the roof of the hearth and arranged to direct fuel on to the upper surface of a pool of metal contained in the hearth, means for supplying steam to the second burners, and means for producing a water-in-fuel oil emulsion and for forcing said emulsion under high pressure to said second burners.

3. In a furnace having a hearth adapted to contain a pool of molten metal, and a roof arranged directly over the hearth, burners positioned at the roof of the hearth and arranged to direct a fuel emulsion on to the upper surface of a pool of metal contained in the hearth, means for supplying steam to said burners, and means for producing a water-in-fuel oil emulsion and for forcing said emulsion under high pressure to said burners.

MARVIN W. DITTO.